US012321257B2

(12) United States Patent
Abhishek

(10) Patent No.: US 12,321,257 B2
(45) Date of Patent: *Jun. 3, 2025

(54) METHOD, APPARATUS, AND SYSTEM FOR BLAMING A TEST CASE/CLASS FOR A SURVIVED MUTATION

(71) Applicant: DevFactory Innovations FZ-LLC, Dubai (AE)

(72) Inventor: Abhishek, Samastipur (IN)

(73) Assignee: DevFactory Innovations FZ-LLC, Dubai (AE)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,548

(22) Filed: Nov. 8, 2022

(65) Prior Publication Data

US 2023/0060212 A1 Mar. 2, 2023

Related U.S. Application Data

(63) Continuation of application No. 16/837,570, filed on Apr. 1, 2020, now Pat. No. 11,520,693, which is a
(Continued)

(51) Int. Cl.
| | |
|---|---|
| *G06F 11/3668* | (2025.01) |
| *G06F 8/41* | (2018.01) |
| *G06F 8/65* | (2018.01) |
| *G06F 11/3604* | (2025.01) |
| *G06F 11/362* | (2025.01) |
| *G06F 11/3698* | (2025.01) |

(52) U.S. Cl.
CPC .......... *G06F 11/3692* (2013.01); *G06F 8/41* (2013.01); *G06F 8/65* (2013.01); *G06F 11/3612* (2013.01); *G06F 11/3624* (2013.01); *G06F 11/3676* (2013.01); *G06F 11/3684* (2013.01); *G06F 11/3698* (2025.01)

(58) Field of Classification Search
None
See application file for complete search history.

(56) References Cited

U.S. PATENT DOCUMENTS

| | | | |
|---|---|---|---|
| 2014/0019925 A1* | 1/2014 | Grosse ................. | G06F 30/398 716/107 |
| 2014/0115396 A1* | 4/2014 | Fournier .............. | G06F 11/263 714/33 |

(Continued)

OTHER PUBLICATIONS

Notice of Allowance mailed Aug. 8, 2022, filed in U.S. Appl. No. 16/837,570, pp. 1-6.
(Continued)

*Primary Examiner* — Qing Chen

(57) ABSTRACT

A method and apparatus for upgrading libraries in a source code program by evaluating libraries in the source code program for predetermined selection criteria specifying library performance limitations to identify at least a first library which does not meet the plurality of predetermined selection criteria and then identifying a first alternative library that is suitable for substitution for the first library so that the source code program may be automatically modified to replace the first library with the first alternative library, thereby generating a modified source code program having an upgraded library functionality.

16 Claims, 6 Drawing Sheets

Related U.S. Application Data continuation of application No. 16/118,675, filed on Aug. 31, 2018, now Pat. No. 10,642,726.

(56) References Cited

U.S. PATENT DOCUMENTS

| | | | |
|---|---|---|---|
| 2015/0379187 A1* | 12/2015 | Gou | G06F 30/398 |
| | | | 716/107 |
| 2017/0098053 A1* | 4/2017 | Pandey | G16B 50/00 |
| 2017/0220450 A1* | 8/2017 | Tokumoto | G06F 11/3612 |
| 2019/0104047 A1* | 4/2019 | Tejaprakash | H04L 43/50 |
| 2019/0138433 A1* | 5/2019 | Krishnan | G06F 11/3684 |

OTHER PUBLICATIONS

Terminal Disclaimer filed Jul. 5, 2022 in U.S. Appl. No. 16/837,570, pp. 1-2.
Terminal Disclaimer approved Jul. 5, 2022, filed in U.S. Appl. No. 16/837,570, p. 1.
Response to Final Office Action dated Jul. 5, 2022, filed in U.S. Appl. No. 16/837,570, pp. 1-5.
Final Office Action mailed Mar. 3, 2022, filed in U.S. Appl. No. 16/837,570, pp. 1-5.
Examiner Interview Summary Record dated Mar. 3, 2022, filed in U.S. Appl. No. 16/837,570, p. 1.
Response to Non-Final Office Action dated Feb. 7, 2022, filed in U.S. Appl. No. 16/837,570, pp. 1-7.
Non-Final Office Action mailed Sep. 7, 2021, filed in U.S. Appl. No. 16/837,570, pp. 1-17.

* cited by examiner

```
| Injected Mutation | Original Source Code |

28
29 ▶  public String getVersionId() {
30       return _versionId ;
31   }
32
33 ▶  public Map<String, String> getMetadata() {  ← 313
34       return _metadata ;
35   }
36
37 ▶  public byte[] getData() {
38       return _data ;          ⎫
39   }                           ⎬ 314
40                               ⎭
41
```

310 →
311 →
312 SOURCE CODE VIEWING PANE

FIG. 3B

```
| Injected Mutation | Original Source Code |
```

320

321 → Injected Mutation | Original Source Code public String getVersionId() {
  return this._versionId ;
} public Map<String, String> getMetadata() {
  return this._metadata ;
}
← 313 public byte[] getData() {
  return this._data ;
} ← 314
} public String getVersionId() {
  return this._versionId ;
} public Map<String, String> getMetadata() {
  return this._metadata ;
}
← 323 public byte[] getData() {
  if (this._data == null) {
    throw new RuntimeException() ;
  }
  return null ;
} ← 324
}

322
SOURCE CODE

FIG. 3C

METHOD, APPARATUS, AND SYSTEM FOR BLAMING A TEST CASE/CLASS FOR A SURVIVED MUTATION

BACKGROUND OF THE INVENTION

Field of the Invention

The present invention is directed in general to field of information processing. In one aspect, the present invention relates generally to software testing.

Description of the Related Art

Computer programmers, developers, coders and/or software engineers write, test, debug, and maintain computer software or code instructions, called computer programs, which computers must follow to perform their functions. When testing a computer program, a collection of test cases (collectively referred to as a test suite) is applied to test the computer program to show that it has some specified set of behaviors. A test suite often contains detailed instructions or goals for each collection of test cases and information on the system configuration to be used during testing. However, the quality of a test suite must be evaluated to determine not only the code coverage for the test suite (e.g., what percentage of the execution paths in the computer program have been exercised during automated testing), but also the test accuracy and user case completeness of the test suite. One approach for improving the adequacy of tests to better identify defects in the code is through mutation testing (a.k.a., mutation analysis or program mutation) whereby new software tests are designed through a process where the program code is modified or "mutated" in predetermined ways and then evaluated by a test suite to determine if the test suite detects and rejects (or "kills") the mutants. For example, mutations may be generated by using well-defined mutation operators that either mimic typical programming errors (such as using the wrong operator or variable name) or force the creation of valuable tests (such as dividing each expression by zero). Test suites are measured by the percentage of mutants that they kill, and new tests can be designed to kill any surviving mutants. However, while conventional mutation test tools (such as the PIT mutation testing system) can identify which mutations survived, they provide only block coverage reports, making it very difficult for a developer/tester to understand which specific part of the test suite failed and should be modified to kill the surviving mutant(s). Additional drawbacks with conventional mutation test tools is that they have significant rates of false positive reporting (e.g., 20-50%), require different plugins for different build systems (e.g., pitest maven plugin, pitest ant plugin, etc.), have limited test failure tolerance, and/or limited stability (e.g., buggy). As seen from the foregoing, the existing solutions for performing mutation coverage testing are extremely difficult at a practical level by virtue of the difficulty in using the mutation test system to accurately and efficiently identify and upgrade test suites.

SUMMARY OF THE INVENTION

A system, apparatus, computer program product, and methodology are described for efficiently identifying a test case and/or test class in a test suite that is responsible for a survived mutation to help a program developer/tester to modify the old test case/class or write a new test case in the correct test class to kill the survived mutation. Selected embodiments of the present disclosure automatically apply specified test case identification rules to a list of tests which cover a surviving mutation to identify one or more test cases or classes which are likely responsible for missing the mutation. After generating source code mutations and applying a test suite, each surviving mutation is analyzed to automatically identify which test case/method or test class is responsible for missing the mutation. In a first step of the analysis, the process assembles a list (L) of all test case(s)/method(s) which cover a given mutation, and if the list (L) contains a single test method/case, then the test method/case on the list is identified or blamed as being responsible for missing the mutation. In a second step of the analysis, the process then filters the list (L) to remove any test method(s)/case(s) that killed another mutation, and if the resulting filtered list contains a single test method/case, the that test method/case is identified or blamed as being responsible for missing the mutation. In a third step of the analysis, the process identifies a name (X) for the mutated method, and then searches through the filtered list to identify any test case/method which includes the name X as part of its name, in which case that matching test case/method is identified or blamed as being responsible for missing the surviving mutation. And if no specific test method is identified, then the analysis moves to the test class level by first determining if all of the test methods on the filtered list belong to a single test class, in which case the test class is identified/blamed as being responsible. If not, then the process searches through a list (L2) of distinct test class names for the test case(s)/method(s) remaining on the filtered list to identify any class which includes the name X as part of its name, in which case that matching test class is identified or blamed as being responsible for missing the surviving mutation. And if there is no test class which contains the name X, then the first test class on the test class list (L2) is identified or blamed as being responsible for missing the surviving mutation.

The objects, advantages and other novel features of the present invention will be apparent from the following detailed description when read in conjunction with the appended claims and attached drawings.

BRIEF DESCRIPTION OF TILE DRAWINGS

The present invention may be understood, and its numerous objects, features and advantages obtained, when the following detailed description of a preferred embodiment is considered in conjunction with the following drawings.

Figure 3A:
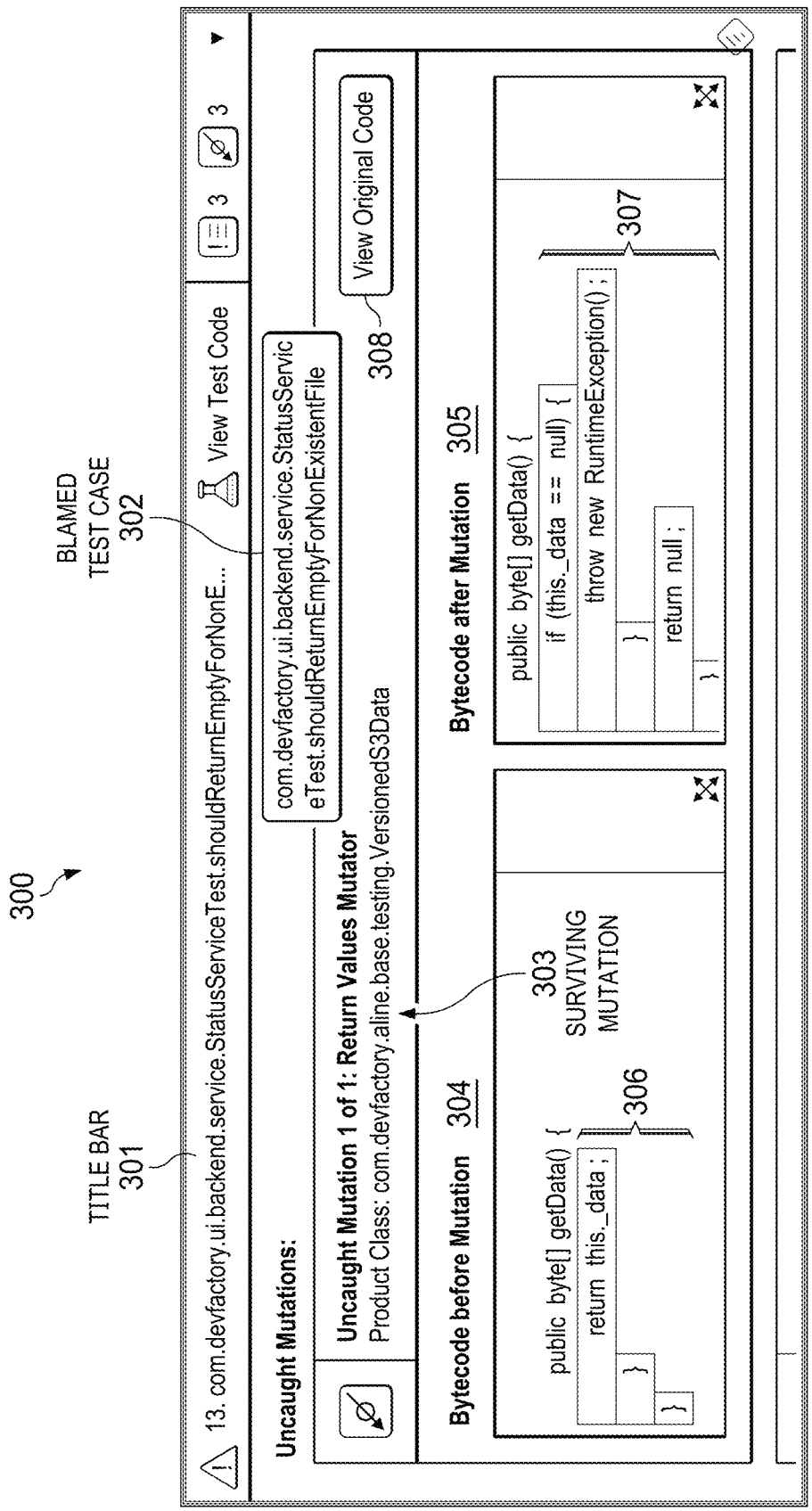

FIGS. 3A-C illustrate an example sequence of user interface screens which may be generated by the mutation testing engine that automatically identifies test cases responsible for missing a surviving mutation in accordance selected embodiments of the present disclosure.

Figure 4:
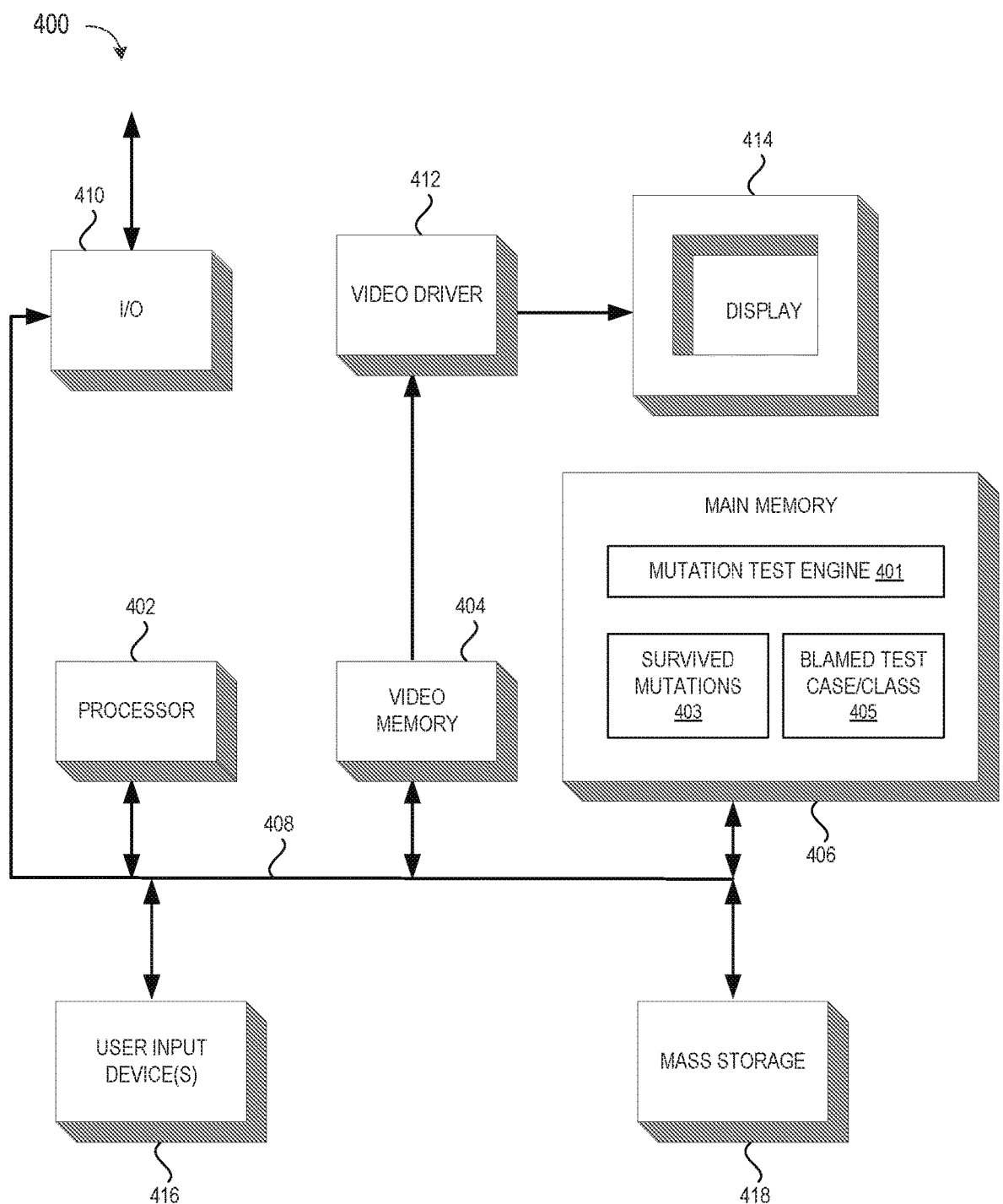

FIG. 4 is a simplified block diagram of a general-purpose computer in accordance with selected embodiments of the present disclosure.

DETAILED DESCRIPTION

A mutation testing engine, methodology, computer program product, system, and apparatus are described for efficiently improving test suite coverage by automatically evaluating test cases which cover a surviving mutation against specified selection rules to identify a test case or class which uniquely correspond to a surviving mutation for use in identifying a test case that can be modified and/or write a new test case in a correct test class to kill the survived mutation. In disclosing the mutation testing engine, methodology, computer program product, system, and apparatus for blaming a test case or class by using specific rules, rather than humans, to provide an automated sequence for identifying problematic test cases or classes with reports that provide line coverage for mapping mutations to responsible test cases, there is disclosed an improvement in computer-related technology that uses a combined order of specific rules that renders information into a specific format that is then used and applied to create desired results in the form of improved test suites for evaluating the performance of computer programs.

While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
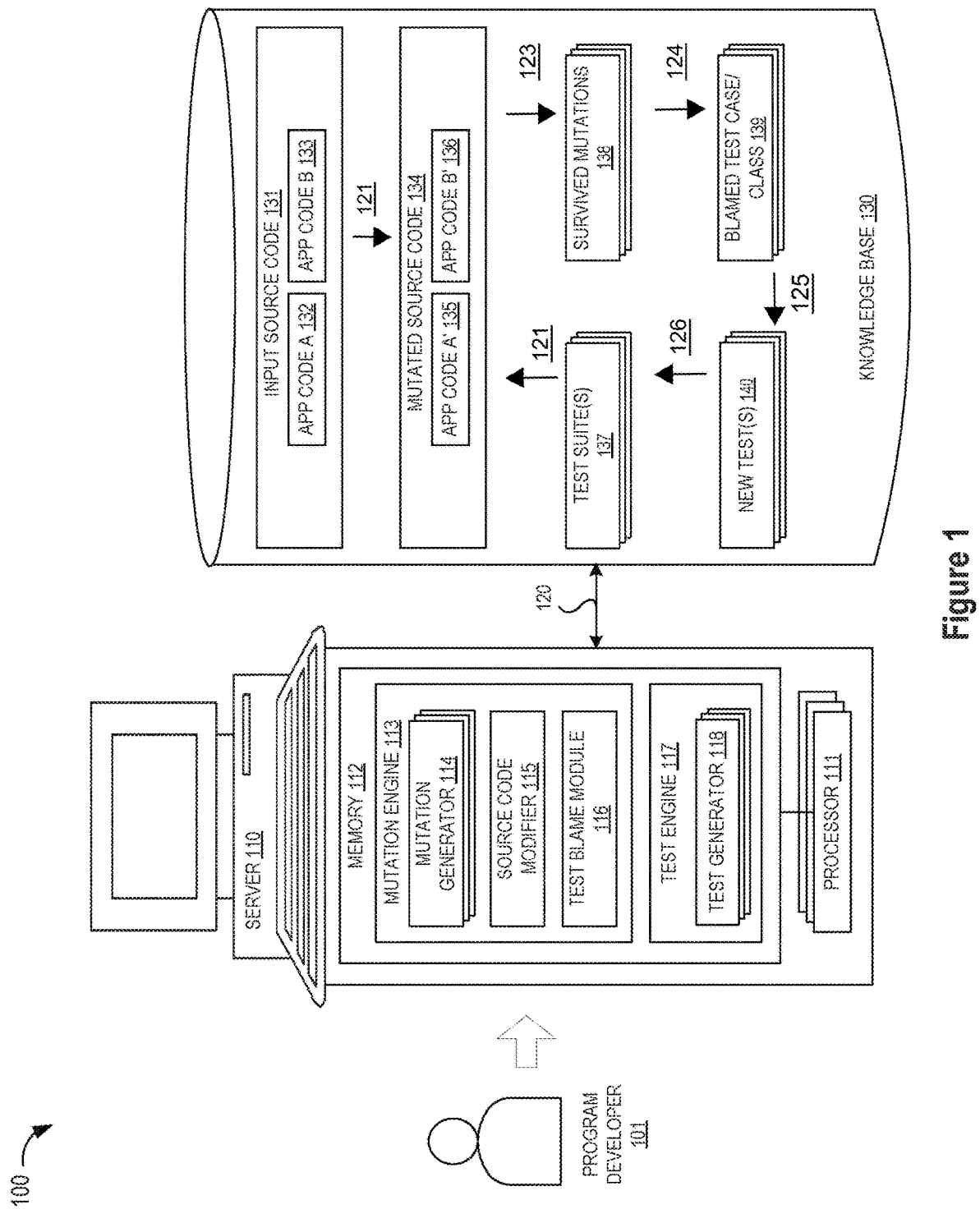
FIG. 1 is a simplified block diagram of a data processing system for identifying test cases responsible for surviving mutations and for generating new tests to address surviving mutations in accordance with selected embodiments of the present disclosure.

Referring now to FIG. 1, a simplified block diagram illustrates an exemplary data processing system 100 for identifying test cases responsible for surviving mutations and for generating new tests to address surviving mutations with one or more server/computer systems 110 having processor(s) 111, memory 112, and associated database storage devices 130 which may be connected together over a suitable connection link 120 or network, such as a private wide area network (WAN) or the Internet (not shown). To illustrate the operative functionality of the data processing system 100, the server memory 112 may be used to store the program module functionality for the mutation engine 113. As described hereinbelow, the mutation engine 113 acts upon the input source code files 131 and/or data from the database storage devices 130 in a first processing step 121 to generate mutated source code files 134 using any desired mutation technique for modifying the input source code files 131. For example, the mutation generator 114 may define a plurality of mutators, such as the Increments Mutator, Void_Method_Call_Mutator, Return_Vals_Mutator, Math_Mutator, Negate_Conditionals_Mutator, Invert_Negs_Mutator, or Conditionals_Boundary_Mutator. Using inputs from the mutation generator 113, the source code modification module 115 may dynamically change one or more application code segments 132, 133 in the input source code files 131, thereby generating mutated source code files 134 having one or more mutated application code segments 135, 136 which are generated for the purpose of causing test failures in the mutated source code 134.

To detect such failures, the server/computer system 110 may also include a test engine 117 that is configured to test the mutated source code files 134-136 by applying one or more test suites 137. For example, the test engine 117 may compile and build the modified source code 134 and run one or more test generator modules 118 to generate one or more test suites 137 that may be stored in the database 130, and then run the test suite(s) 137 on the mutated source code files 134 (processing step 122) to identify any survived mutations 138 (processing step 123). If one of the tests in the test suite 137 "fails" upon detecting a change caused by a mutated source code file (e.g., 135), then the mutant is said to be killed. However, if the test suite 137 does not detect a change caused by a mutated source code file (e.g., no test fails), then the mutated source code file is said to "survive," and may be collected with the survived mutations 138 (processing step 123).

As disclosed herein, the server/computer system 110 may include computer program functionality for identifying a specific test case and/or test class in the test suite 137 that is likely responsible for missing the survived mutation. To this end, the mutation engine 113 may also include a test blame module 116 which is configured to identify or "blame" a test case or test class 139 (processing step 124) help a program developer/tester understand which test should be changed to make the mutation die. As described more fully hereinbelow, the test blame module 116 acts upon each survived mutation 138 to identify a list (L) of all test cases from the test suite 137 which cover the survived mutation. For example, the test suite 137 of all test cases for the input source code 131 may be run to get the line coverage details for each source code file using any suitable code coverage library tool, such as JaCoCo, Sonar, EclEmma, Cobertura, CodeCover, Coverage.py, Gretel, JCov, and the like. Then, the list of covering test cases is evaluated against a series of rules or conditions that may be used to blame either a test case or test class that is responsible for missing the survived mutation. Generally speaking the narrowing down the list of covering test cases through a combination of filtering test cases which killed another mutation and name matching techniques until a single remaining or matching test case or class can be identified or blamed. With an assembled listing of blamed test cases/classes 139, the program developer/tester can generate new tests 140 (processing step 125), such as by modifying the blamed test case/class or writing a new test case in the blamed test class to kill the survived mutation. By updating the test suite 137 with the new test(s) 140 (processing step 126), the test engine 117 can run more effective test suites against the input source code 131 and/or mutated source code 134.

The operation of the mutation engine 113 and/or test engine 117 to transform input source code files 131 into mutated source code files 134 which are then tested with the test suites 137 to identify and blame test cases 139 that are responsible for survived mutations 138 through the automated action of the source code modification module 116 is shown with processing steps 121-126, though it will be appreciated that the underlying data may be stored in the database storage device 130 and/or memory 112.

In selected illustrative embodiments, the server/computer system 110 may be embodied as a Question Answering (QA) system to use NLP, machine learning, and/or artificial intelligence processing techniques which are augmented with the mechanisms of the illustrative embodiments described hereafter. In a QA system implementation, the mutation engine 113 and/or test engine 117 may be embodied as a computer program stored in memory 112 which uses one or more processors 111 to query a structured or unstructured knowledge or information database 130. In particular, the mutation engine 113 may retrieve one or more input source code files 131-133 from the database 130 for use in generating mutated source code files 134. In addition, the test engine 117 may retrieve the mutated source code files 134 and one or more test suites 137 which are generated and/or stored, and then run the test suite(s) 137 against the mutated source code files 134. Using the test blame module 116, the mutation engine 113 may then identify survived mutations 138 for evaluation against specified selection rules to identify or "blame" the test case or class 139 which is responsible for each survived mutation. The configuring of the mutation and testing engines 113, 117 may include providing application specific hardware, firmware, and/or software to implement one or more control logic modules 113-118 or the like to facilitate the performance of the operations and generation of the outputs described herein with regard to the illustrative embodiments. In addition or in the alternative, the configuring of the mutation and testing engines 113, 117 may include storing software applications in one or more storage devices and loaded into memory of a computing device, such as server 110, for causing one or more hardware processors (e.g., 111) of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

In selected embodiments, test cases or classes that are "blamed" for missing a mutation may be presented to the program/test developer in a user interface display screen which has a first mutation pane (providing summary information about a surviving mutation that was not caught by the test suite), a second test case pane (providing summary information about the test case which is blamed for not killing the mutation), and one or more additional code panes (providing summary information for the original code and/or mutated code). The user interface display screen may also include a link for viewing the original code and/or injected mutation.

As will be appreciated, once the server/computer system 110 is configured to implement the mutation and testing engines 113, 117, the server/computer system 110 becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates the automatic identification or "blaming" of test cases and classes from the test suite which cover the mutation and are likely responsible for not killing the mutation, thereby identifying a candidate test case for a survived mutation which the developer/tester may modify or write a new test case in the correct test class to kill the survived mutation.

Figure 2:
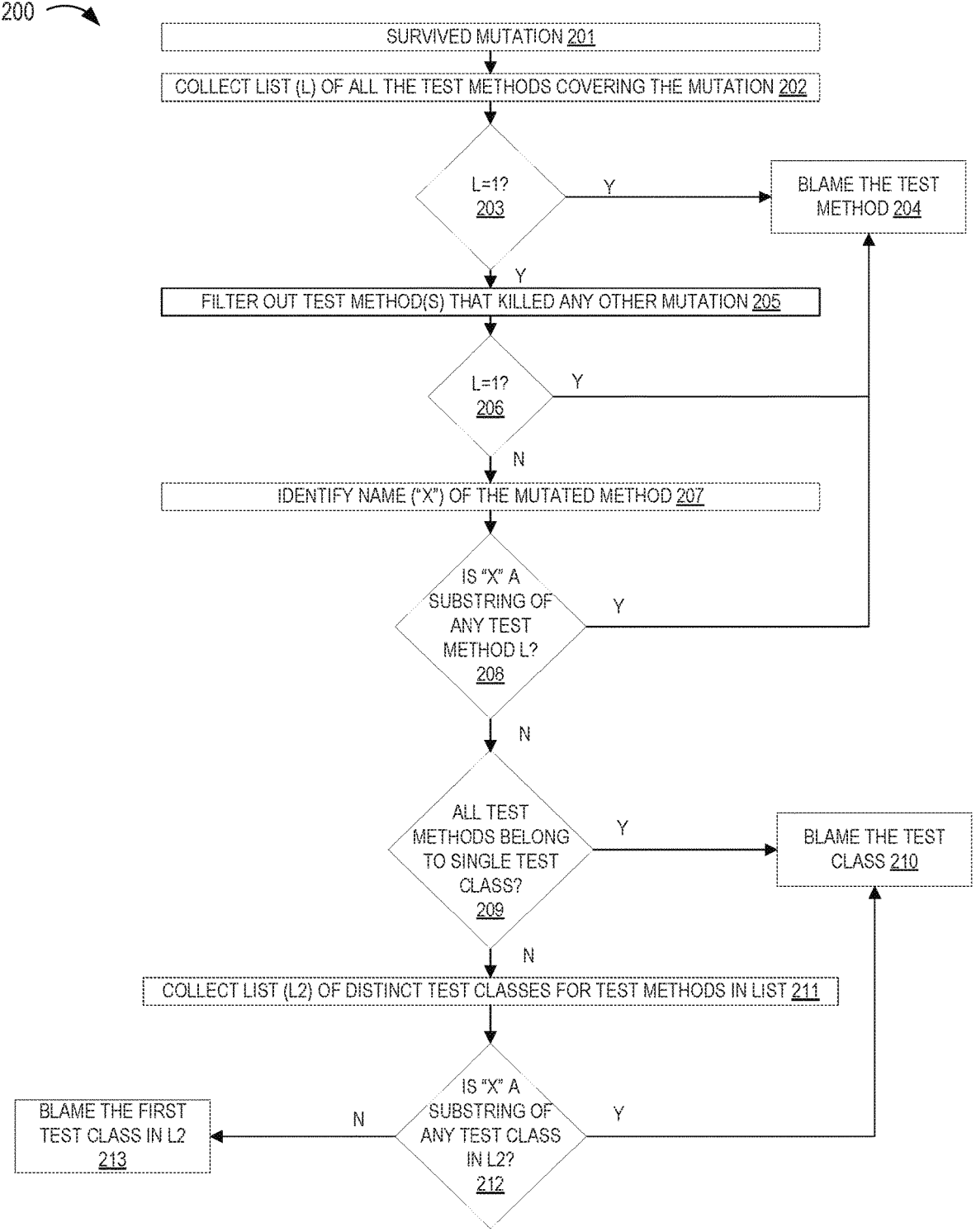
FIG. 2 illustrates a simplified flow chart showing the logic for automatically identifying test cases responsible for surviving mutations in accordance with selected embodiments of the present disclosure.

To provide a contextual understanding for selected embodiments of the present disclosure, reference is now made to FIG. 2 which illustrates a simplified mutation test processing workflow 200 showing the logic and/or processing steps for automatically identifying test cases responsible for surviving mutations in accordance selected embodiments of the present disclosure. In selected embodiments, the depicted mutation test processing workflow 200 may be implemented in whole or in part with a data processing system (such as shown in FIG. 1) and/or a single integrated circuit (e.g., a system-on-chip) or a plurality of integrated circuits to implement one or more processors with local memory and database storage that are interconnected and interoperate using any suitable technique without departing from the present invention.

However implemented, the mutation test processing workflow 200 receives information identifying one or more survived mutations (step 201). As will be appreciated, a list of survived mutations may be received upon performing mutation testing or analysis on input source code having one or more mutated files (e.g., App Code A' or App Code B' in FIG. 1) which may be created by a source code modifier which applies mutation operators to an input source code file. On the modified source code, test cases from a test suite are run to identify surviving mutations which are not killed by the test suite, and the process then evaluates each mutation in an attempt to blame a test case or class that is responsible for missing the mutation.

As a preliminary step 202, each surviving source code mutation is evaluated to identify and collect a list of all of the test cases or methods from the test suite which cover the survived mutation. As will be appreciated, the processing step 202 may be performed by the mutation engine 113 or the blame module 116 using any suitable coverage framework which provides line coverage details for each surviving source code mutation, including but not limited to the JaCoCo code coverage library tool or similar such tools. To provide an example case for purposes of illustrating this step, a survived mutation received at step 201 is the method, "A.B.check( )," and the processing step 201 identifies the test cases which cover this mutation as "A.B.testCheck( )" and "A.B.testBreak( )." As a result of step 202, a list "L" of covering test methods or cases is generated. As a result of step 202, a list "L" of covering test methods or cases is generated.

After assembling the list (L) of covering test methods, the list is evaluated at step 203 to see how many test methods are on the list. If an affirmative outcome to detection step 203 indicates that only a single test method covers the surviving mutation (e.g., L=1), then the single test method is blamed for the surviving mutation (step 204). However, a negative outcome to detection step 203 indicates that there are multiple covering test methods for the surviving mutation (e.g., L>1), in which case additional processing is required. This is illustrated with the example case where the processing at step 203 determines that there are two covering test cases (namely, "A.B.testCheck( )" and "A.B.testBreak( )"), so the process continues to step 205.

At step 205, the list of covering test methods is filtered to remove any test methods that also killed another mutation. In selected embodiments, the processing step 205 may be performed by the mutation engine 113 or the blame module 116 using any suitable filtering technique, such as marking as "ignored" any test cases which killed at least one mutation, and then deleting the ignored tests from the list over covering test cases. After filtering the assembled list (L) of covering test methods, the filtered list is evaluated at step 206 to see how many test methods remain. If an affirmative outcome to detection step 206 indicates that only a single filtered test method covers the surviving mutation (e.g., L=1), then the single test method is blamed for the surviving mutation (step 204). However, a negative outcome to detection step 206 indicates that there are still multiple covering test methods for the surviving mutation (e.g., L>1), in which case additional processing is required. This is illustrated with the example case where the processing at step 206 determines that the list (L) contains multiple covering test methods since neither of the covered test methods (namely, "A.B.testCheck( )" and "A.B.testBreak( )") were filtered.

At step 207, another test method identification process begins which seeks to use name matching techniques to identify a test case which matches the surviving mutation. In particular, the processing step 207 may use the mutation engine 113 or the test blame module 116 to identify a name (e.g., "X") of the mutated source code. In selected embodiments, the processing step 207 uses any suitable extraction technique, such as natural language processing (NLP) techniques to find a method name for the source code where the mutation happened. This is illustrated with the example case where the processing at step 207 identifies the name string "X"="check( )" from the method name where the mutation happened. After determining the method name, the name is evaluated at step 208 to find a match with any covering test methods in the list. If an affirmative outcome to detection step 208 indicates that the name "X" is a substring in one of the covering test methods, then the matching test method (or methods) is blamed for the surviving mutation (step 204). This is illustrated with the example case where the processing at step 208 determines that there is a test case (e.g., "A.B.testCheck( )") having the method name "check( )" in it, so the matching test case (e.g., "A.B.testCheck( )") is blamed at step 204. As will be appreciated, if multiple test methods match the name component, then each test method may be blamed at step 204. However, if no match is detected (e.g., negative outcome to detection step 208), then this indicates that additional processing is required.

At this point in the "blaming" process sequence 201-208, no single test case in the list (L) has been blamed since the filtering and name matching techniques have failed to sufficiently narrow the list (L) to a single culprit. Accordingly, the next stage in the process sequence is to check at step 209 if all the test cases in the list (L) belong to the same test class which can be blamed. If the all of the test cases in the filtered list belong to a single test class (affirmative outcome to detection step 209), then the test class is blamed (step 210), in which case the program developer/tester can be directed to write a new test case in the correct test class to kill the survived mutation. However, if the covered test methods in the filtered list belong to multiple test classes (negative outcome to detection step 209), then this indicates that additional processing is required.

Beginning with step 211, the "blaming" process begins applying name matching techniques to identify a test class from the list of test cases which matches the surviving mutation. In particular, the processing step 211 may use the mutation engine 113 or the test blame module 116 to apply any suitable extraction technique, such as natural language processing (NLP) techniques, to find distinct test class names for all test methods in the filtered list (L). Once the test class names are assembled in a second list (L2), the test class names are evaluated against the previously identified name (e.g., "X") of the mutated source code to find a match at step 212. If an affirmative outcome to detection step 212 indicates that the name "X" is a substring in one of the distinct test class names in the second list (L2), then the matching test class (or test classes) is blamed for the surviving mutation (step 210). As will be appreciated, if multiple test classes match the name component, then each test class may be blamed at step 210. However, if no match is detected (e.g., negative outcome to detection step 212), then the first test class in the second list (L2) is blamed (step 213). As will be appreciated, the rank ordering of the test classes in the second list (L2) may be determined based on relative weighting or scoring factors, such as the number of lines covered by each test class, but any suitable ordering scheme may be used to rank the test classes.

Once a test method or class is identified or "blamed" as being responsible for a survived mutation (steps 210, 213), the test suite may be modified by the program/test developer in to either modify the "blamed" test case or write a new test case in the "blamed" test class to kill the survived mutation. To this end, the identified test cases or classes that are "blamed" for missing a mutation may be presented to the program/test developer in a user interface display screen.

To provide additional details for an improved understanding of selected embodiments of the present disclosure, reference is now made to FIGS. 3A-C which depict an example sequence of user interface screen shots which may be generated by the mutation testing engine that automatically identifies test cases responsible for missing a surviving mutation in accordance selected embodiments of the present disclosure. In the first example screen shot of user interface 300 shown in FIG. 3A, there is displayed a first user interface screen 300 which shows the "blamed" test case along with information identifying the mutation that happened.

For example, the user interface 300 includes information identifying the test case that is blamed for a surviving mutation that was not killed by the test suite, such as the name of the test case (com.devfactory.ui.backend.service.StatusServiceTest.shouldReturnEmptyForNonExistentFile) in the title bar or a first test case pane 302 which provides summary information about the test case from the test suite case which is blamed for not killing the mutation surviving. The user first user interface screen 300 may also include a second mutation pane 303 which provides summary information about the surviving mutation, such as information identifying the method (e.g., com.devfactory.aline.base.testing.VersionedS3Data) and the type of mutation (e.g., Return Values Mutator). In selected embodiments, the first user interface screen 300 may include one or more additional information panes, such as a first pane 304 which lists the input bytecode before mutation and a second pane 305 which lists the input bytecode after mutation, including one or more visual indications 306, 307 to specify what mutation was actually made. If the user wants to see the original source code, the first user interface screen 300 may include a first button 308 or other user-activated link for opening a new user interface screen in which the input source code can be seen with a more detailed view showing the specific code lines where the mutations were made.

By using the cursor or other user interface controls to interact with the first user interface screen 300, the developer may cause the mutation testing engine to display a second user interface screen shot 310 which displays the original source code (as indicated by the selected button 311), as illustrated in FIG. 3B. In this example, the user interface 310 provides a button 311 which is selected to display the original source code in a source code viewing pane 312 wherein the original source code 313 is displayed with corresponding line numbers and a visual indication 314 specifying the original source code prior to mutation.

By using the cursor or other user interface controls to interact with the second user interface screen 310, the developer may cause the mutation testing engine to display a third user interface screen shot 320 which also displays the mutated source code (as indicated by the selected button 321), as illustrated in FIG. 3C. In this example, the user interface 320 includes a source code viewing pane 322 which displays, not only the original source code 313 and associated visual indication 314, but also displays the mutated source code 323 with corresponding line numbers and a visual indication 324 specifying the injected mutation. With the third user interface screen shot 320, the mutation testing engine provides a way for the program/test developer to see what change actually happened at the bytecode level by using a decompiler to get it in the code form again to show these as source code to help the developer to easily understand the change.

Embodiments of the system and method for identifying test cases or classes that are responsible for missing mutations can be implemented on a computer system, such as a general-purpose computer 400 illustrated in FIG. 4. As disclosed the computer 400 includes input user device(s) 416, such as a keyboard and/or mouse, which are coupled to a bi-directional system bus 408. The input user device(s) 416 are used for introducing user input to the computer system 400 and communicating that user input to processor 402. The computer system 400 may also include a video memory 404, main memory 406, and mass storage 418, all coupled to bi-directional system bus 408 along with input user device(s) 416 and processor 402. The mass storage 418 may include both fixed and removable media, such as other available mass storage technology. Bus 408 may contain, for example, 32 address lines for addressing video memory 404 or main memory 406. The system bus 408 may also include, for example, an n-bit data bus for transferring data between and among the components, such as CPU 402, main memory 406, video memory 414, and mass storage 418, where "n" is, for example, 32 or 64. Alternatively, multiplex data/address lines may be used instead of separate data and address lines.

The computer 400 may also include I/O device(s) 410 which provide connections to peripheral devices, such as a printer, and may also provide a direct connection to remote server computer systems via a telephone link or to the Internet via an ISP. I/O device(s) 410 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 418 until loaded into main memory 406 for execution. Computer programs may also be in the form of electronic signals modulated in accordance with the computer program and data communication technology when transferred via a network. The method and functions relating to system and method for automatically blaming test cases/classes may be implemented in a computer program for a mutation test engine 401 which evaluates a list of survived mutations 403 against a plurality of covering test cases for each survived mutation to identify or blame a corresponding test case or class 405 for each survived mutation.

The processor 402, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 406 is comprised of dynamic random access memory (DRAM). Video memory 404 is a dual-ported video random access memory. One port of the video memory 404 is coupled to video amplifier or driver 412. The video amplifier 412 is used to drive the display 414. Video amplifier 412 is well known in the art and may be implemented by any suitable means. This circuitry converts pixel data stored in video memory 404 to a raster signal suitable for use by display 414. Display 414 is a type of monitor suitable for displaying graphic images.

By now, it will be appreciated that there is disclosed herein a system, method, apparatus, and computer program product for enhancing operable testing functionality for program code by performing a method at a device having a processor and a memory. As disclosed, the system, method, apparatus, and computer program receive a program and associated test suite comprising a plurality of test cases submitted by a developer, such as by compiling source code into program code. Subsequently, a mutation is performed on a code segment in the program code to generate a mutated code segment, thereby transforming the program code into mutated program code using one or more predetermined mutation rules. In selected embodiments, the mutation of the code segment is performed by modifying one or more values within the program code. After generating the mutated code, execution of the test suite against the mutated code segment is monitored to detect a surviving mutation which is evaluated against the test suite to identify a first test case to blame for the surviving mutation by analyzing a coverage of the plurality of test cases in the test suite for the surviving mutation to identify one or more test cases from the test suite which cover the surviving mutation and then select the first test case which meets one or more predetermined selection criteria. In selected embodiments, the surviving mutation is evaluated against the test suite by determining that the one or more test cases include only a single test case which is selected as the first test case under a first predetermined selection criteria. In other embodiments, the surviving mutation is evaluated against the test suite by filtering the one or more test cases to remove any test case which killed another mutation so that only a single test case remains which is selected as the first test case under a second predetermined selection criteria. In other embodiments, the surviving mutation is evaluated against the test suite by comparing a name segment from the surviving mutation with name segments from the one or more test cases to identify a single test case having a matching name segment which is selected as the first test case under a third predetermined selection criteria. In addition, the surviving mutation may be evaluated against the test suite to identify a first test class to blame for the surviving mutation by assembling a list of distinct test classes from the one or more test cases in the test suite which cover the surviving mutation and then selecting the first test class which meets one or more test class selection criteria. In selected embodiments, the surviving mutation is evaluated to identify the first test class by determining that the list of distinct test classes includes only a single test class which is selected as the first test class under the one or more test class selection criteria. In other embodiments, the, the surviving mutation is evaluated to identify the first test class by comparing a name segment from the surviving mutation with name segments from the list of distinct test classes identify a single test class having a matching name segment which is selected as the first test class. Once a first test case or test class is selected, a recommendation may be presented that the first test case or test class be modified to detect the surviving mutation, where the recommendation comprises one or more user interface screens displaying information identifying the first test case and the surviving mutation with line coverage information for the survived mutation.

The present invention may be a system, a method, and/or a computer program product such that selected embodiments include software that performs certain tasks. The software discussed herein may include script, batch, or other executable files. The software may be stored on a machine-readable or computer-readable storage medium, and is otherwise available to direct the operation of the computer system as described herein and claimed below.

In one embodiment, the software uses a local or database memory to implement the data transformation and data structures so as to automatically detect and identify test cases or classes that are likely responsible for each survived mutation, thereby improving the quality and robustness of software, educating developers about test suite upgrade opportunities and implementations, and generate more readable, reliable, smaller, and robust code with less effort.

The local or database memory used for storing firmware or hardware modules in accordance with selected embodiments of the present disclosure may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

In addition, selected aspects of the present disclosure may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present disclosure may take the form of computer program product embodied in a computer readable storage medium or media having computer readable program instructions thereon for causing a processor to carry out aspects of the present disclosure. Thus embodied, the disclosed system, a method, and/or a computer program product is operative to improve the design, functionality and performance of software programs by automatically detecting and recommending "blamed" test cases or classes in the test suite for upgrade or replacement to better detect mutations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Visual Basic.net, Ruby, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system described above is for purposes of example only, and may be implemented in any type of computer system or programming or processing environment, or in a computer program, alone or in conjunction with hardware. Various embodiments of the present may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. The system and method for identifying and recommending test suite upgrades may be implemented in any type of computer system or programming or processing environment. It is contemplated that the system and method for generating test suite upgrade recommendations for addressing survived mutations might be run on a stand-alone computer system, such as the one described above. The system and method for generating test suite upgrade recommendations might also be run from a server computer systems system that can be accessed by a plurality of client computer systems interconnected over an intranet network. Finally, the system and method for generating test suite upgrade recommendations may be run from a server computer system that is accessible to clients over the Internet.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for enhancing operable testing functionality for program code, comprising:
   executing code, stored in a memory, by one or more processors of a first computer system to perform operations comprising:
   receiving, by the first computer system and from a second computer system, program code and an associated test suite, wherein the associated test suite comprises a plurality of test cases;
   mutating, by the first computer system, a code segment in the program code to generate a mutated code segment;
   monitoring, by the first computer system, execution of the associated test suite against the mutated code segment to detect a surviving mutation;
   evaluating, by the first computer system, the surviving mutation against the associated test suite to identify a first test case to blame for the surviving mutation by analyzing a coverage of the plurality of test cases in the associated test suite for the surviving mutation to identify one or more test cases from the associated test suite which cover the surviving mutation and then select the first test case which meets one or more predetermined selection criteria, wherein evaluating the surviving mutation against the associated test suite comprises at least one of (1) determining that the one or more test cases include only a single test case which is selected as the first test case under a first predetermined selection criterion, (2) filtering the one or more test cases to remove any test case which killed another mutation so that only a single test case remains which is selected as the first test case under a second predetermined selection criterion, or (3) comparing a name segment from the surviving mutation with name segments from the one or more test cases to identify a single test case having a matching name segment which is selected as the first test case under a third predetermined selection criterion;

providing, by the first computer system, to a device at least one of (1) information that identifies the first test case or (2) the first test case, which covers the surviving mutation;

based on providing to the device at least one of (1) information that identifies the first test case or (2) the first test case, which covers the surviving mutation, generating, by the first computer system, a second test case that can kill the surviving mutation, wherein the second test case is a new test case or a modification of the first test case; and executing, by the first computer system, the second test case to kill the surviving mutation.

2. The method of claim 1, wherein receiving the program code comprises compiling source code into the program code.

3. The method of claim 1, wherein mutating the code segment in the program code comprises modifying one or more values within the program code.

4. The method of claim 1, wherein evaluating the surviving mutation against the associated test suite comprises determining that the one or more test cases include only the single test case which is selected as the first test case under the first predetermined selection criterion.

5. The method of claim 1, further comprising:
executing the code, stored in the memory, by the one or more processors of the first computer system to further perform operations comprising:
evaluating, by the first computer system, the surviving mutation against the associated test suite to identify a first test class to blame for the surviving mutation by assembling a list of distinct test classes from the one or more test cases in the associated test suite which cover the surviving mutation and then selecting the first test class which meets one or more test class selection criteria.

6. The method of claim 5, where evaluating the surviving mutation against the associated test suite to identify the first test class comprises determining that the list of distinct test classes includes only a single test class which is selected as the first test class under the one or more test class selection criteria.

7. The method of claim 1, further comprising:
executing the code, stored in the memory, by the one or more processors of the first computer system to further perform operations comprising:
presenting, by the first computer system, a recommendation that the first test case be modified to detect the surviving mutation, where in the recommendation comprises one or more user interface screens displaying information identifying the first test case and the surviving mutation with line coverage information for the surviving mutation.

8. The method of claim 1, wherein the device is the second computer system.

9. A method for enhancing operable testing functionality for program code, comprising:
executing code, stored in a memory, by one or more processors of a computer system causes the computer system to perform operations comprising:
receiving, by the computer system, program code and an associated test suite, wherein the associated test suite comprises a plurality of test cases;

mutating, by the computer system, a code segment in the program code to generate a mutated code segment;

monitoring, by the computer system, execution of the associated test suite against the mutated code segment to detect a surviving mutation;

evaluating, by the computer system, the surviving mutation against the associated test suite to identify a first test case to blame for the surviving mutation by analyzing a coverage of the plurality of test cases in the associated test suite for the surviving mutation to identify one or more test cases from the associated test suite which cover the surviving mutation and then select the first test case which meets one or more predetermined selection criteria, wherein evaluating the surviving mutation against the associated test suite comprises at least one of (1) determining that the one or more test cases include only a single test case which is selected as the first test case under a first predetermined selection criterion, (2) filtering the one or more test cases to remove any test case which killed another mutation so that only a single test case remains which is selected as the first test case under a second predetermined selection criterion, or (3) comparing a name segment from the surviving mutation with name segments from the one or more test cases to identify a single test case having a matching name segment which is selected as the first test case under a third predetermined selection criterion;

generating, by the computer system, a second test case that can kill the surviving mutation, wherein the second test case is a new test case or a modification of the first test case; and executing, by the computer system, the second test case to kill the surviving mutation.

10. The method of claim 9, wherein evaluating the surviving mutation against the associated test suite comprises filtering the one or more test cases to remove any test case which killed another mutation so that only the single test case remains which is selected as the first test case under the second predetermined selection criterion.

11. The method of claim 9, wherein evaluating the surviving mutation against the associated test suite comprises comparing a name segment from the surviving mutation with name segments from the one or more test cases to identify the single test case having a matching name segment which is selected as the first test case under the third predetermined selection criterion.

12. The method of claim 9, wherein executing the code, stored in the memory, by the one or more processors of the computer system causes the computer system to further perform operations comprising:
evaluating, by the computer system, the surviving mutation against the associated test suite to identify a first test class to blame for the surviving mutation by assembling a list of distinct test classes from the one or more test cases in the associated test suite which cover the surviving mutation and then selecting the first test class which meets one or more test class selection criteria.

13. The method of claim 12, wherein evaluating the surviving mutation against the associated test suite to identify the first test class comprises determining that the list of distinct test classes includes only a single test class which is selected as the first test class under the one or more test class selection criteria.

14. The method of claim 9, wherein executing the code, stored in the memory, by the one or more processors of the computer system causes the computer system to further perform operations comprising:

presenting, by the computer system, a recommendation that the first test case be modified to detect the surviving mutation, wherein the recommendation comprises one or more user interface screens displaying information identifying the first test case and the surviving mutation with line coverage information for the surviving mutation.

15. The method of claim 9, wherein receiving the program code comprises compiling source code into the program code.

16. The method of claim 9, wherein mutating the code segment in the program code comprises modifying one or more values within the program code.

\* \* \* \* \*